United States Patent
Jirnov et al.

(10) Patent No.: US 6,523,347 B1
(45) Date of Patent: Feb. 25, 2003

(54) THERMODYNAMIC POWER SYSTEM USING BINARY WORKING FLUID

(76) Inventors: Alexei Jirnov, 9105 Braeburn Valley Dr., Unit 14, Houston, TX (US) 77074; Mikhail A. Jirnov, 9105 Braeburn Valley Dr., Unit 14, Houston, TX (US) 77074

( * ) Notice: Subject to any disclaimer, the term of this patent is extended or adjusted under 35 U.S.C. 154(b) by 0 days.

(21) Appl. No.: 09/805,019

(22) Filed: Mar. 13, 2001

(51) Int. Cl.$^7$ ............................................. F01K 25/08
(52) U.S. Cl. ................................ 60/651; 60/671; 62/87
(58) Field of Search ....................... 60/651, 671; 62/86, 62/87, 402, 467

(56) References Cited

U.S. PATENT DOCUMENTS

| | | | |
|---|---|---|---|
| 3,154,928 A | * 11/1964 | Harmens | |
| 3,992,891 A | * 11/1976 | Pocrnja | ........................... 62/53 |
| 5,839,270 A | * 11/1998 | Jirnov et al. | ............... 60/39.05 |
| 5,996,355 A | * 12/1999 | Jirnov et al. | .................... 62/87 |
| 6,161,392 A | * 12/2000 | Jirnov | ..................... 62/67 |

* cited by examiner

Primary Examiner—Hoang Nguyen
(74) Attorney, Agent, or Firm—Kenneth A. Roddy (57) ABSTRACT

A thermodynamic power system has a low-temperature closed bottoming cycle using a first working fluid (first gas) and open or closed modified Brayton topping cycles using a second working fluid (second gas). In the bottoming cycle a mixture of a first gas such as helium or hydrogen and a fine dispersed low-temperature non-freezable lubricating liquid is polytropically compressed in a compressor and then the liquid content is separated from the first gas. The separated first gas is isobarically heated using heat from the second gas and then the heated first gas is adiabatically expanded and cooled while performing useful work and thereafter is fed to the compressor and mixed with the separated liquid to serve as a coolant and facilitate rejection of polytropic heat and to supplement the cool gas/liquid mixture providing polytropic compression of the first gas and thus completing the bottoming cycle. The low-temperature bottoming cycle functions to cool the second working fluids of the open or closed modified Brayton topping cycles before their compression. The power system using a high temperature heat source can generate a large amount of specific power to achieve a high actual thermal efficiency greater than 0.8.

12 Claims, 6 Drawing Sheets

Temperature-entropy diagram of ideal low-temperature bottoming cycle

Theoretical specific relative power (represented in full line) and theoretical relative refrigerating effect (represented in dashed line) of the bottoming apparatus as a function of expansion ratios $\pi_1$ using Helium as working medium (mass flow rate of Helium $m_1 = 1$ kg/sec)

Fig. 6

Theoretical thermal efficiency of the bottoming cycle as a function of expansion ratios $\pi_1$. Helium is used as working fluid

Fig. 9

Actual specific total power (represented in dashed line) and actual thermal efficiency (represented in full line) of the combined thermodynamic power system as a function of expansion ratios $\pi_2$ for a helium-to-air compostion (mass flow rate of air $m_3$ = 1 kg/scc)

Fig. 8

Temperature-entropy diagram of a high-temperature combined cycles system

THERMODYNAMIC POWER SYSTEM USING BINARY WORKING FLUID

CROSS-REFERENCE TO RELATED APPLICATIONS

This application is closely related to U.S. patent application Ser. No. 09/448,557, pending, and to U.S. Pat. Nos. 6,161,392, and 5,996,355, which are hereby incorporated by reference to the same extent as if fully set forth herein.

BACKGROUND OF THE INVENTION

1. Field of the Invention

This invention relates generally to heat engines that utilize bottoming and topping cycles and binary working fluid, and more particularly to a thermodynamic power system utilizing a binary working fluid and having a low-temperature bottoming cycle and an open or closed modified Brayton topping cycle.

2. Brief Description of the Prior Art

It is known that any thermodynamic system operating on a cycle and receiving heat while doing work must also have a heat-rejection process as part of the cycle. A statement called Carnot's Maxim says: "Heat should be added at the highest temperature and rejection at the lowest possible temperature if the greatest amount of work is to be gained and the highest thermal efficiency is to be realized". Hot gases of combustion are produced in a combustion chamber by burning fuel in air and a maximum temperature of about 2000° is attained. The hot gases obtained from the process are the finite heat reservoir for a thermodynamic cycle. Today's engine design options have both theoretical and practical limits that may be described as follows. The maximum amount of heat that can be transferred from this heat reservoir would be obtained by cooling the gases from the maximum temperature to the atmospheric temperature. Note that cooling goes only to the atmospheric temperature, but not less. Theoretically, this is the "lowest permissible level" of temperature.

This theoretical restriction is a barrier that inhibits the development of energy technology. However, Kelvin's statement of the Second Law of Thermodynamics does not state or imply this restriction. The development of the Second Law of Thermodynamics is based primarily on heat engine analysis. The gist of Kelvin's statement of the Second Law Of Thermodynamics is that no cyclic process is possible whose sole result is a flow of heat from a single reservoir and the performance of equivalent work. Thus, the basic Statement of the Second Law of Thermodynamics determines only that a heat engine cannot convert into work all of the heat supplied to the working fluid; it must reject some heat.

For a hydroelectric station, the "lowest permissible level" of temperature is restricted by the level of the ocean. For the working process of a heat engine, the "lowest permissible level" of the air temperature may be significantly below the temperature of the "air ocean". Furthermore, the heat engine may use the heat of that "air ocean" as a reservoir for producing power and cool refrigerated air simultaneously because the working fluid gas has an ability to alter its physical parameters depending on the pressure and temperature differentiate of the liquid.

Most prior art systems having thermodynamic cycles require two external heat reservoirs for the heat-addition and heat-rejection processes. however, a heat-rejection process may be made up in closed cycles without an external heat reservoir, provided that the working medium is a combined mixture of a non-condensable first gas such as helium or hydrogen and a fine dispersed low-temperature non-freezable lubricating liquid such as nitrogen, oil, water with antifreeze, etc., wherein the low-temperature liquid is used as an internal cold reservoir to carry out the heat-rejection process and the non-condensable first gas is cooled during adiabatic expansion producing useful work and serves as a coolant to heated liquid recovering from an initial condition of the gas/liquid mixture. Therefore, it is possible to construct a heat engine which will do work and exchange heat using a single external heat reservoir for the heat-addition process only. The conversion of the heat energy into another form is appreciably enhanced by employing a binary working fluid in the low-temperature closed bottoming cycle and for cooling of the working fluid of the open or closed modified Brayton topping cycles before its compression.

Heat engines are known in the art which have combined cycles such as a combination of Brayton and Rankin cycles. Fruschi, U.S. Pat. No. 5,386,685 discloses a method and apparatus for a combined cycle power plant. Simpkin, U.S. Pat. No. 5,431,016 discloses a high efficiency power generation engine. One of the principal shortcomings of these combined cycle systems is that they are not capable of cooling air before or during its compression in the topping Brayton cycle.

The present invention is distinguished over the prior art, and is a significant advance over our commonly owned previous patent application Ser. No. 09/448,557. pending and U.S. Pat. Nos. 6,161,392, and 5,996,355, which are incorporated herein by reference. A major distinction is that, in the present invention, conversion of the heat energy into another form is appreciably enhanced by employing a binary working fluid in a low-temperature closed bottoming cycle for cooling of the working fluid of the open or closed modified Brayton topping cycles during the continuous compression process. The working process of the present invention produces a cooled first gas at a cryogenic temperature in the bottoming cycle which is significantly less that the temperature of ambient air which is cooled by being drawn through a heat exchanger of the bottoming cycle and then compressed. Thus, the work of compression is significantly reduced and the amount of power is significantly increased.

The present thermodynamic power system embodiment with an open modified Brayton topping cycle using a high-temperature heat source can generate a large amount of specific power to achieve a high thermal efficiency. The present thermodynamic power system embodiment with a closed modified Brayton topping cycle can be effectively utilized as an engine for a space station using a solar heat source. Such a space energy device has significant advantages over conventional devices because it utilizes a heat-rejection process without an external heat exchanger. It also allows use of an inexpensive fuel source.

SUMMARY OF THE INVENTION

It is therefore an object of the present invention to provide a thermodynamic power system that can generate a large amount of specific power to achieve a high actual thermal efficiency.

It is another object of this invention to provide a thermodynamic power system that is inexpensive to manufacture in mass production and is inexpensive to operate, service, and repair.

Another object of this invention is to provide a thermodynamic power system that has applicability as an engine in industry, as well as applications for outer space.

Other objects of the invention will become apparent from to time throughout the specification and claims as hereinafter related.

The above noted objects of the invention are accomplished by a thermodynamic power system that utilizes a cryogenic refrigeration bottoming cycle operating on a two-phase (binary) working fluid (gas/liquid mixture) in combination with several different topping cycles. In a first embodiment the topping cycle is an open modified Brayton topping cycle using a high temperature heat source and, in a second embodiment, the topping cycle is a closed modified Brayton topping cycle. The low-temperature bottoming cycle functions to cool the working fluid of the toppings cycles.

The apparatus of the bottoming cycle includes a sliding-blade gas/liquid compressor and expander unit, a vortex separator, a heat exchanger, a plurality of liquid atomizers, a pump, gas and liquid storage tanks, temperature and pressure sensors, and control means for adjustably controlling the volume of fluids in the system contained within a thermally insulated housing. In the operation of the bottoming cycle, rotation of the gas/liquid compressor and expander rotor draws a first gas (helium or hydrogen) from the expander operating chamber into the gas/liquid compressor operating chamber.

Simultaneously, a fine dispersed low-temperature lubricating liquid (such as nitrogen, oil, water with antifreeze, etc.) is injected into the operating chamber of the gas/liquid compressor through the plurality of liquid atomizers to produce a cool gas/liquid mixture at a quantity sufficient for polytropic heat adsorption and polytropic compression of the first gas.

The compressed cool gas/liquid mixture is discharged into the vortex separator where the cool first gas that rejected polytropic heat is separated from the low-temperature liquid and supplied to the heat exchanger where it is isobarically heated using heat of ambient air as the working fluid of the open modified Brayton topping cycle or rejected heat of the working fluid of the closed modified Brayton topping cycle. The compressed and heated first gas then enters the expander operating chamber where it is adiabatic expanded and cooled doing useful work by rotating the gas expander and gas/liquid compressor rotor. The adiabatically expanded and cooled first gas with a cryogenic temperature is discharged from the gas expander operating chamber and enters the gas/liquid compressor operating chamber of the expander and compressor units and is mixed with the fine dispersed low-temperature liquid during gas compression to serve as a coolant and facilitate rejection of polytropic heat exchanging with liquid and supplement the cool gas/liquid mixture which is polytropically compressed to complete the bottoming cycle.

The apparatus of the open modified Brayton topping cycle using a high-temperature heat source with regeneration includes an air compressor, a gas turbine, a heat-exchanger/recuperator, a combustion chamber and a power apparatus. In the operation of the open topping, cycle the air compressor draws ambient air through the heat exchanger of the bottoming cycle where it is cooled. The cool air is compressed in the air compressor of the topping cycle and discharged into the heat exchanger/recuperator of the topping cycle where it is preheated using waste heat and fed to the combustion chamber. The heated air from the combustion chamber enters the gas turbine, is adiabatically expanded performing useful work and causing simultaneous rotation of the air compressor rotor. Spent working fluid from the gas turbine is supplied to the heat exchanger/recuperator isobarically giving up its waste heat to the compressed air and afterwards is exhausted.

The apparatus of the closed modified Brayton topping cycle includes a gas compressor, a gas turbine, a heat exchanger/recuperator, a heat exchanger/combustor, a gas storage tank, temperature and pressure sensors, and control means for adjustably controlling the volume at fluids in the system. In the operation of the closed topping cycle, rotation of the gas compressor rotor draws a second gas from the heat exchanger of the bottoming cycle where it is cooled. The second cool gas is compressed in the gas compressor and discharged into the topping cycle heat exchanger/recuperator where it is preheated using waste heat and then enters the heat exchanger/combustor using solar heat, geothermal heat or other heat source including an inexpensive fuel, such as coal and then enters the operating chamber of the gas turbine doing useful work by simultaneously rotating the gas turbine and gas compressor rotors. The expanded second gas from the gas turbine is supplied to the heat exchanger/recuperator isobarically giving up its waste heat to the compressed first gas. The precooling second gas is discharged from the heat exchanger/recuperator into the heat exchanger of the bottoming cycle and is cooled transferring its remainder of waste heat to the working fluid of the bottoming cycle. The expanded and cooled second gas with a cryogenic temperature is discharged from the heat exchanger of the bottoming cycle and is fed to the gas compressor and compressed to complete the closed topping cycle.

DESCRIPTION OF THE PREFERRED EMBODIMENTS

In the following discussion, some of the structural components of the present invention are somewhat similar to features that are described in our commonly owned previous patent application Ser. No. 09/448,557, pending, and in U.S. Pat. Nos. 6,161,392, and 5,996,355, which are hereby incorporated by reference to the same extent as if fully set forth herein. The present invention incorporates significant improvements in structure and operation over the previous patent application and patents. This incorporation-by-reference is for the purpose of simplifying the drawings and descriptions of the present invention and, also for the purpose of providing a clear and concise description of this invention. The reader may refer to the above patents for a more detailed description of particular structural components of the apparatus of the present system.

Figure 1:
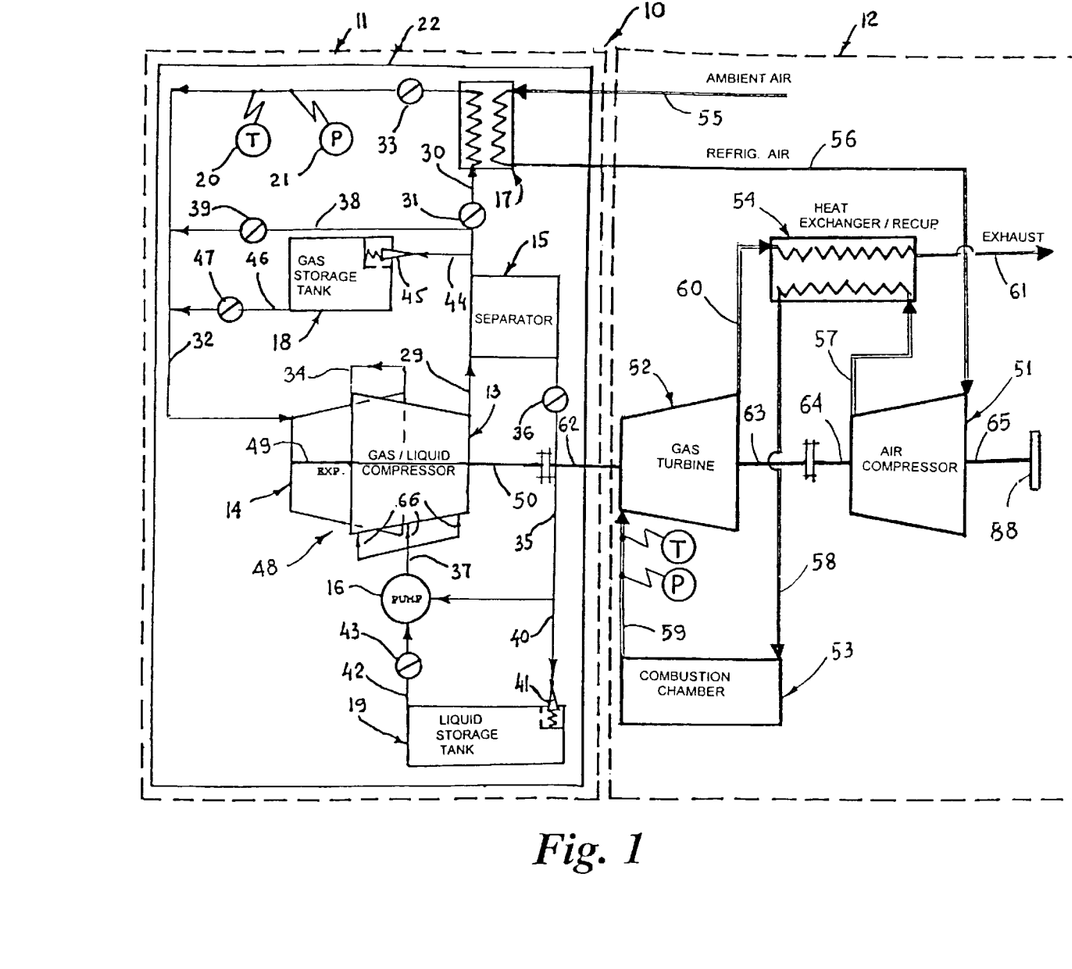
FIG. 1 is a schematic block diagram of the thermodynamic power system having a low-temperature closed bottoming cycle and an open modified Brayton topping cycle in accordance with the present invention.

FIG. 1 shows a schematic diagram of a first preferred embodiment of the combined thermodynamic power system 10 using a binary working fluid in accordance with the present invention. The embodiment of FIG. 1 has a closed low-temperature bottoming cycle 11 and a high-temperature open modified Brayton toppings cycle 12 represented by dashed line. The apparatus 11 of the bottoming cycle includes a sliding-blade gas/liquid compressor 13 and gas expander 14 joined together as unit 48, a vortex separator 15, a plurality of liquid atomizers 66 connected with the compressor, a pump 16, a heat exchanger 17, a gas storage tank 18, a liquid storage tank 19, and temperature and pressure sensors 20 and 21, which are contained within a thermally, insulated housing 22. A non-condensable first gas such as helium or hydrogen far from its saturation point is stored in the gas storage tank 18, and a fine dispersed low-temperature non-freezable lubricating liquid such as nitrogen, oil, water with antifreeze, etc., is stored in the liquid storage tank 19 under high pressure.

The flow paths of the working fluids are shown by arrows in FIG. 1 during the operation of the bottoming 11 and topping 12 cycles. As the rotor of the gas-liquid compressor and gas expander unit 48 rotates, the supercooled first gas is drawn into the gas/liquid compressor 13 from gas expander 14. Simultaneously, the fine dispersed low-temperature liquid from the storage tank 19 is injected into the operating chamber of the gas/liquid compressor 13 through the plurality of liquid atomizers 66 by means of the pump 16 and the mixture is compressed in a polytropic process in the gas-liquid compressor. The compressed cool gas/liquid mixture is discharged into the vortex separator 15 through a conduit 29 where the cool first gas is separated from the low-temperature liquid and supplied to the heat exchanger 17 through a conduit 30 and a throttle 31.

The separated first gas is isobarically heated in the heat exchanger 17 using heat of the ambient air of the working fluid of the open topping open cycle or rejected heat of the closed topping cycle working fluid and then enters the gas expander 14 through a conduit 32 containing a throttle 33 and temperature sensor 20 and pressure sensor 21 which are disposed below the throttle 33.

During adiabatic expansion and supercooling, the first gas performs useful work by causing simultaneously rotation of the units 48 of the gas expander 14 and gas/liquid compressor 13 rotor. The adiabatically expanded and supercooled first gas with a cryogenic temperature is discharged from the operating chamber of the gas expander 14 and enters the operating chamber of the gas/liquid compressor 13. The separated liquid from the separator 15 is supplied to the pump 16 through a conduit 35 and throttle 36 and pumped through the conduit 37 and liquid atomizers 66 into the operating chamber of the gas/liquid compressor 13 to produce a cool gas/liquid mixture. The adiabatically expanded and supercooled first gas serves as a coolant and is used to facilitate rejection of polytropic heat and supplement the cool gas/liquid mixture that is compressed in a polytropic process to complete the bottoming cycle.

The conduit 32 between the gas expander 14 and the heat exchanger 17 and the conduit 30 between the vortex separator 15 and the heat exchanger 17 are joined together by a bypass conduit 38 containing a throttle 39. The bypass conduit 38 is disposed below the throttles 31 find 32 to conduct flow through the bypass when the throttle 39 is open and the throttles 31 and 33 are closed.

The liquid storage tank 19 has an inlet connected to the conduit 35 between the throttle 36 and the pump 16 through a conduit 40 and a one-way spring valve 41 and has all outlet connected to the pump 16 through a conduit 42 containing a throttle 43.

The gas storage tank 18 has an inlet connected to the conduit 30 through conduit 38 between the vortex separator 15 and the throttle 31 through a conduit 44 and one-way spring valve 45 and has an outlet connected to the conduit 32 below a throttle 33 through a conduit 46 containing a throttle 47.

Temperature and pressure sensors 20 and 21 are disposed in conduit 32 adjacent to its juncture with the bypass conduit 38. The temperature and pressure sensors 20 and 21 are connected with the throttle 33, 39, 47, and 31 to control their operation in response to the temperature and pressure in the conduit 32, and thereby regulate the power conditions.

The throttles 33, 39, and 31 control the mode of operation of the heat exchanger 17. Throttle 47 meters out the first gas into the system from the gas storage tank 18. Throttle 43 meters Out the liquid into the system from the liquid storage tank 19. Throttle 36 located in the conduit 35 allows additional control of the first gas and liquid distributed from the vortex separator 15 through the conduits 35 and 30.

The spring valves 45 and 41 maintain a predetermined pressure in the gas storage tank 18 and the liquid storage tank 19, respectively. The rotor of the gas/liquid compressor and expander unit 48 has common shaft 50.

The apparatus of the open topping cycle portion 12 of the first embodiment of the system 10 includes a rotary gas compressor 51, a gas turbine 52, a combustion chamber 53, and heat exchanger/recuperator 54.

In operation of the system 10, as the rotor of the air compressor 51 of the topping cycle 12 rotates, ambient air is drawn through a conduit 55 into the heat exchanger 17 of the bottoming cycle 11 where it is cooled and enters the air compressor 51 of the topping cycle 12 through conduit 56. The cool air is compressed in the air compressor 51 and discharged through a conduit 57 into the heat exchanger/recuperator 54 where it is preheated using waste heat and passed to the combustion chamber 53 through a conduit 58. The heated air from the combustion chamber 53 enters the gas turbine 52 through a conduit 59, where it is adiabatically expanded performing useful work and causing simultaneous rotation of the rotors of the gas turbine 52 and air compressor 51. Spent working fluid from the gas turbine 52 is supplied to the heat exchanger/recuperator 54 through a conduit 60 and is isobarically cooled by giving up its waste heat to the compressed air and is discharged through an exhaust port 61.

The shaft 50 of the rotor of the gas/liquid compressor and gas expander unit 48 of the bottoming cycle 11 and the shafts 62, 63, and 64 of the rotors of the gas turbine 52 and air compressor 51 of the topping cycle 12 are joined together by suitable means such that the rotors rotate together. A pulley 88 is mounted on the outer end of the shaft 65 of the rotor of the air compressor 51 for power take off.

Figure 2:
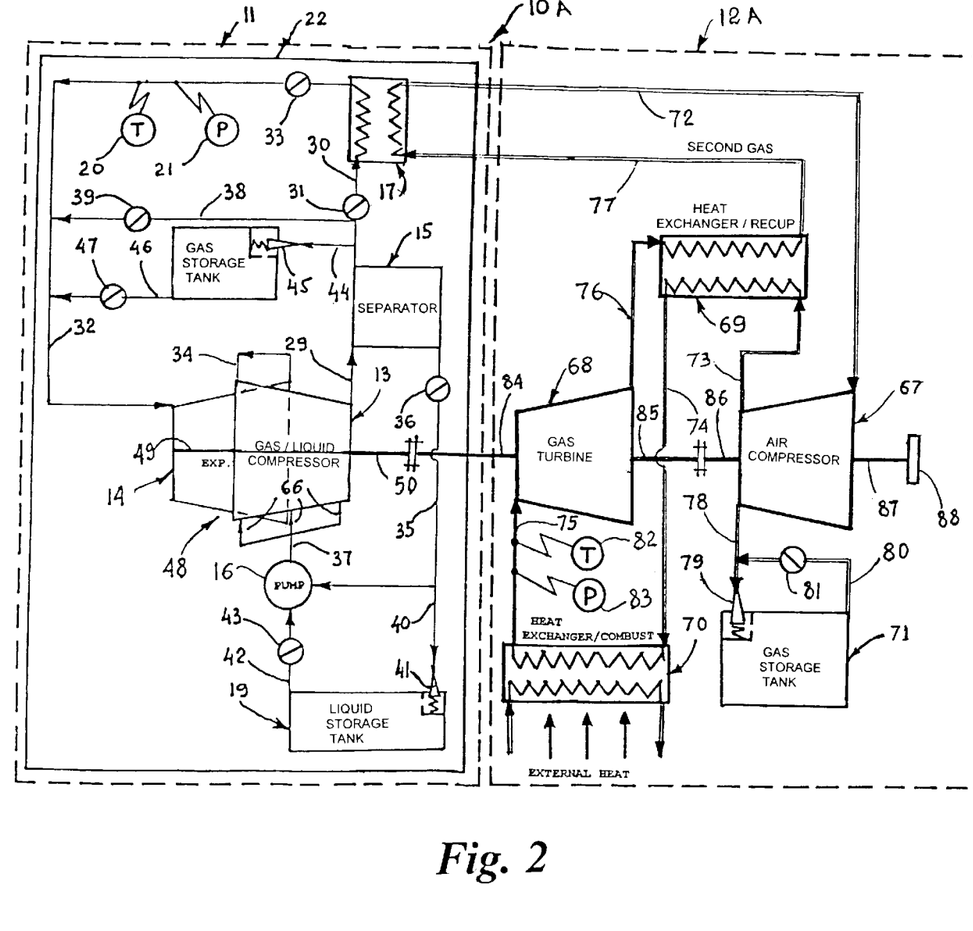
FIG. 2 is a schematic block diagram of the thermodynamic power system having a low-temperature closed bottoming cycle and a closed modified Brayton topping cycle in accordance with the present invention.

Referring now to the block diagram FIG. 2 there is shown a second preferred embodiment of the power system 10A wherein the topping cycle portion is a closed modified Brayton topping cycle. The apparatus of the closed bottoming cycle portion 11 of this embodiment is the same as that described previously.

The apparatus of the closed topping cycle portion 12A of the system 10A includes a rotary gas compressor 67, a gas turbine 68, a heat exchanger/recuperator 69, a heat exchanger/combustor 70, and a gas storage tank 71.

In operation of the closed topping cycle portion 12A, as the rotor of the gas compressor 67 rotates, the second gas (helium, hydrogen or air) is drawn through the heat exchanger 17 of the bottoming cycle portion 11 whereupon it is cooled and enters the gas compressor 67 of the topping cycle portion 12A through a conduit 72. The cool second gas is adiabatically compressed in the gas compressor 67 and discharged into the heat exchanger/recuperator 69 through a conduit 73 where it is preheated using waste heat and passed to the heat exchanger/combustor 70 through a conduit 74. The heat exchanger/combustor 70 may utilize various inexpensive heat sources, such as solar heat. geothermal heat, heat of burning coal, etc.

The compressed and isobarically heated first gas then enters the gas turbine through conduit 75. The adiabatically expanded second gas enters the heat exchanger/recuperator 69 through a conduit 76 giving up its waste heat to the cool second gas before its compression, then it is discharged from the heat exchanger/recuperator 69 into the heat exchanger 17 of the bottoming cycle portion 11 of the system through a conduit 77. The second gas is cooled in the heat exchanger 17 by transferring its heat to the first gas (working fluid of the bottoming cycle) and is fed into the gas/compressor 67 of the topping cycle portion 12A through the conduit 72 and it is compressed to complete the closed topping cycle.

The gas storage tank 71 is connected to the outlet of the gas compressor 67 through a conduit 78 and one-way spring valve 79 and has an outlet connected to the conduit 78 through a conduit 80 containing a throttle 81. The temperature and pressure sensors 82 and 83 are connected with the throttle 81 to control their operation in response to the temperature and pressure in the topping cycle portion 12A of the system 10 and thereby regulate the power condition.

The shaft 50 of the rotor of the gas/liquid compressor and gas expander unit 48 of the bottoming cycle 11 and the shafts 84, 85, and 86 of the rotors of the gas turbine 68 and gas compressor 67 of the topping cycle 12A are joined together by suitable means such that the rotors rotate together. A pulley 88 may be mounted on the outlet end of the shaft 87 of the rotor of the gas compressor 67 for power take-off.

Figure 3:
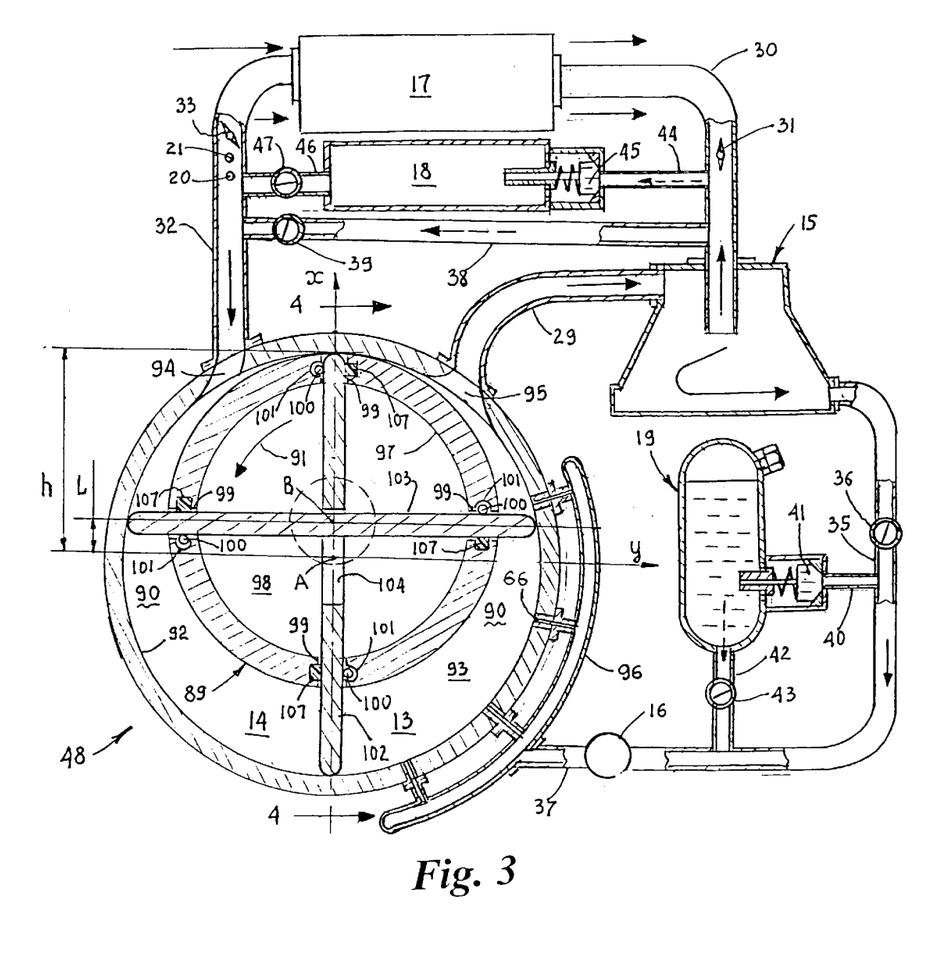
FIG. 3 is a detailed longitudinal cross section through the bottoming cycle apparatus of the power system.
Figure 4:
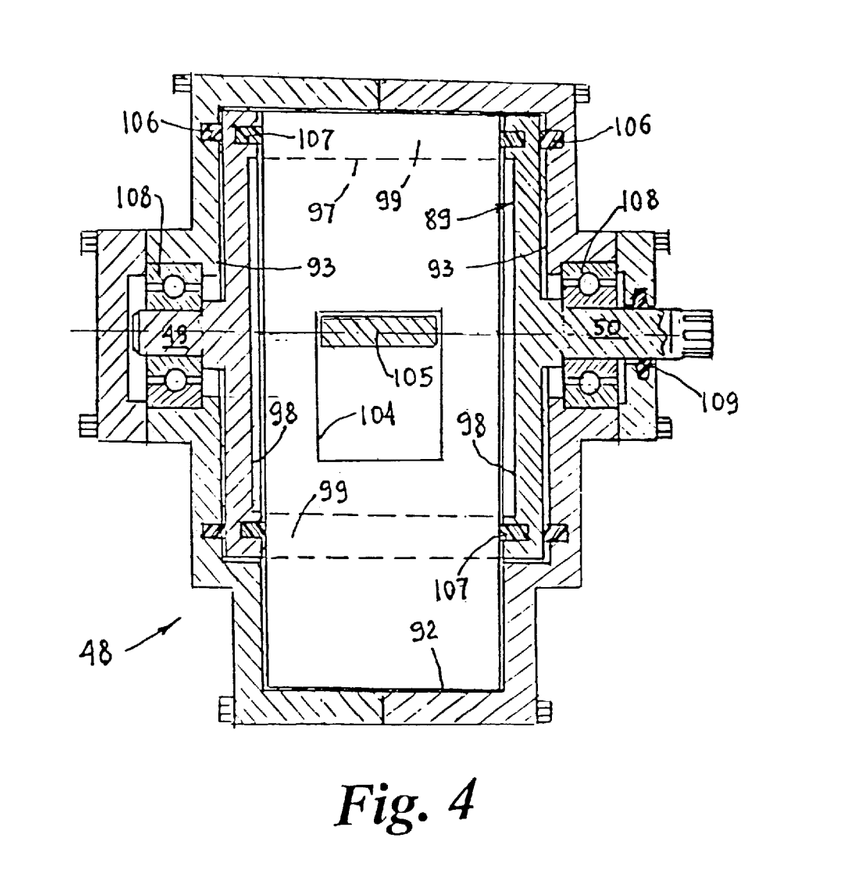
FIG. 4 is a transverse cross section through the gas expander chamber and gas/liquid compressor chamber unit of the power system taken along line 4—4 of FIG. 3.

Referring now to FIGS. 3–4, the apparatus 11 of the bottoming cycle will be described in greater detail. In FIG. 3 the apparatus 11 is shown in transverse cross section. The gas/liquid compressor and gas expander unit 48 of the apparatus 11 is shown in longitudinal cross section in FIG. 4. The gas/compressor and gas expander unit 48 include a sliding-blade rotor 89 positioned within common chamber 90 with the gas expander operating chamber 14 on side of the rotor 89 and the gas/liquid compressor operating chamber 13 on the other side of the rotor 89. With the direction of rotation as shown by arrows 91, the side 14 will act as a gas expander and the side 13 will act as a gas/liquid compressor. The common chamber 90 of gas/liquid compressor and gas expander unit 48 defined by oval-shaped cavities having a contoured oval-shaped side wall 92 and opposed facing end walls 93.

As best seen in FIG. 3 the gas expander operating chamber 14 has an inlet port 94 to allow entry of the first gas into the operating chamber 14 and the gas/liquid compressor operating chamber 13 has an outlet port 95 which allows the gas/liquid mixture to flow out of the compressor operating chamber.

An arcuate hollow liquid channel 96 is spaced a distance from the outside of the side wall 92 of the gas/liquid compressor operating chamber 13. A series of circumferentially spaced liquid atomizers 66 extend radially between the liquid channel and side wall 92 and join the interior of the liquid channel 96 and the interior cavity of the gas/liquid compressor operating chamber 13 in fluid communication.

A sliding-blade rotor 89 of the compressor-expander unit 48 is rotatably disposed in the chamber 90. The rotor 89 is a hollow cylindrical member having a circular side wall 97 and a flat end wall 98. A series of circumferentially spaced rectangular slots 99 extend through the circular side wall 97 of the rotor 89. Rollers 100 are mounted in recesses 101 wall the side walls 97 of the rotor 89 closely adjacent each of the slots 99 with their curved exterior surface producing a short distance into the slot opening.

A pair of perpendicular elongate rectangular rigid blades 102 and 103 are slidably received in the slots 99. One blade 102 is provided with central rectangular opening 104 and the other blade 103 is provided with a central narrow rectangular portion 105 which is received through the opening 104 such that the perpendicular blades 102 and 103 can slide independently relative to one another. The blades 102 and 103 move with the rotor 89 in contact with the oval-shaped side wall 92 extend slidably through the slots 99 in the circular side wall 97, and are support on opposed sides by the rollers 100, as seen in FIG. 3

Elastomeric seals 106 are installed in annular grooves formed in opposed inward facing surfaced of the flat end walls 93 of the oval-shaped chamber 90. These seals form a peripheral fluid sealing relation between the stationary walls 93 and rotating flat end walls 98 of the cylindrical rotor 89. Elastomeric seals 107 are installed in slots 99 the adjacent rollers 100 and in grooves at the outer ends of the flat end walls 98 of the rotor 89. These seals enclose the sliding blades on three sides and form a fluid sealing relation between stationary surfaces of the flat end walls 98 of the rotor 89 and the moving surface of the blades opposite the rollers 100 and also the edge surfaces of the blades.

As best seen in FIG. 4, a shaft 49 secured to the exterior of the one flat end wall 98 of the rotor 89 extends outwardly from the center of the rotor through a hole in the flat end recall 93 of the oval-shaped chamber 90 and a coaxial opposed shaft 50 secured to the exterior of the opposed flat end wall 98 of the oval-shaped chamber 90 extends outwardly from its center through a hole in the opposed flat end wall 93. The shafts 49 and 50 are journalled in the engine housing by bearings 108 and packing gland 109. The outer end of the shaft 50 may be joined by splines or other suitable means with the shaft 62 of the gas turbine 52 of the apparatus of the open topping cycle portion 12 of the first embodiment of the system 10 (FIG. 1) or with the shaft 84 of the gas turbine 68 of the apparatus of the closed topping cycle portion 12A of the second embodiment (FIG. 2).

As shown in FIG. 3 the centerline "B" of the shafts 49 and 50 of the rotor 89 is eccentrically offset from the center "A" of the oval-shaped chamber 90 by a distance "L".

When the rotor 89 turns, the blades 102 and 103 reciprocate radially resting oil the rollers 100 mounted in the wall 97 of the rotor 89 to form four vane blades of variable length in the respective operating chamber contacting with the oval-shaped side wall 92 and function is piston during the compressing and expansion of the working fluid.

The inner surface of the oval-shaped side wall 92 in the rotation plane of the rotor are calculated and configured according the equation:

$$\frac{x^2}{h^2} + \frac{y^2 \, y^2}{(h+1/4L)^2 - L^2} = 1$$

Where x and y=horizontal and vertical coordinates, h=half of vane length≈half of large oval axis, and L=eccentricity.

Operation

In operation of the bottoming cycle 11 of the system 10, at start up, the throttles 31 and 33 are closed to disconnect the heat exchanger 17 and throttles 39, 36, 43, and 47 are opened to allow flow between the chamber of the gas/liquid compressor 13 and chamber of the gas expander 14 through the heat exchanger bypass conduit 38. The shafts 49 and 50 are rotated by the external drive means. Rotation of the shaft and rotor of the gas/liquid compressor 13 draws the first gas from the operating chamber of the gas expander 14 into the operating chamber of the gas/liquid compressor 13. Simultaneously, a fine dispersed low-temperature liquid is injected into the operating chamber of the gas/liquid compressor 13 through the plurality of liquid atomizers 66 to produce a cool gas/liquid mixture. The gas/liquid mixture is compressed in a polytropic process in the compressor 13 and discharged into the vortex separator 15 where the liquid content of the compressed mixture is separated and passed back to the liquid pump to be injected into the operating chamber of the gas/liquid compressor 13. When the steady duty cycle is reached (determined by the temperature and pressure sensors 20 and 21 in conduit 32) the throttles 39, 47, and 43 are closed to shut off flow through the bypass conduit 38 and conduits 42 and 46, and throttles 31 and 35 are opened to allow flow through the heat exchanger 17 and conduits 30 and 32. During operation, the temperature and pressure sensors 20 and 21 control the operation of throttles 31, 33, and 39 to control the heat exchanger 17. The throttle 47 meters out the non-condensed first gas into the system from the storage tank 18, throttle 43 meters out liquid into the system from the liquid storage tank 19, and throttle 36 controls the distribution of additional first gas and liquid separated by the vortex separator 15 into the respective conduits.

The non-condensable first gas separated from the mixture in the vortex separator 15 enters the heat exchanger 17 where it is isobarically heated using heat of the low-temperature heat source and then enters the operating chamber of the gas expander 14 where it is adiabatic expanded and supercooled and performs useful work by causing simultaneous rotation of the shafts 49, 50 and common rotor 89 of the gas expander and the gas/liquid compressor unit 48. The adiabatically expanded and supercooled first gas with a cryogenic temperature is discharged form the gas expander 14 and enters the gas/liquid compressor 13 to be mixed with the liquid and serve as a coolant to facilitate rejection of polytropic heat and supplement the cool gas/liquid mixture which is compressed in a polytropic process to complete the bottoming cycle.

Figure 5:
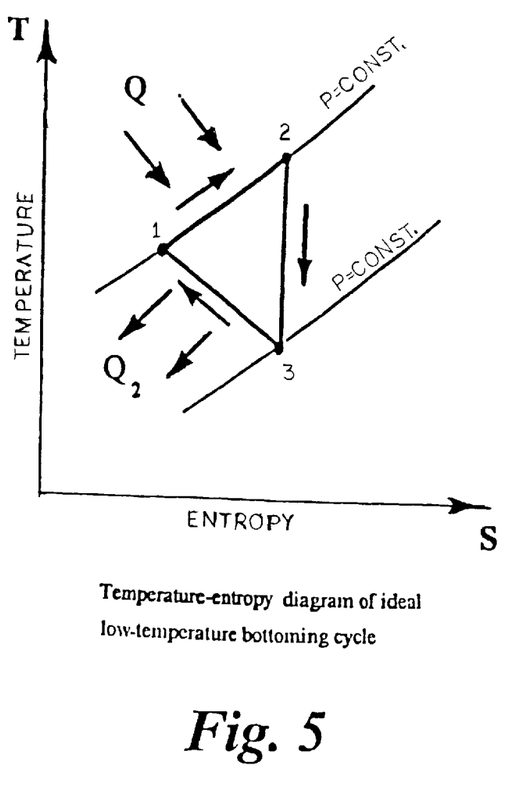
FIG. 5 is a temperature-entropy graph of an ideal low-temperature bottoming cycle.

Referring now to FIG. 3 and the thermodynamic diagram of FIG. 5, as the rotor 89 of the compressor-expander unit 48 turns, an amount of supercooled first gas at a cryogenic temperature $T_3$ and pressure $P_3$ (point 3 in FIG. 5) is drawn into the operating chamber of the gas/liquid compressor 13 mixed and heat exchanger with fine dispersed liquid to absorb polytropic heat and it is compressed in a polytropic process to a pressure $P_1$ and temperature $T_1$ (point 1 in FIG. 5) and discharged into the vortex separator 15 where the gas and liquid are divided or stratified by centrifugal force.

The separated first gas is discharged into the heat exchanger 17, where it accepts part of the heat of the ambient air or other low-temperature heat source thereby isobarically heating it to temperature $T_2$. The compressed and heated first gas enters the operating chamber of the gas expander 14 and is adiabatic expanded from pressure $P_2$ to pressure $P_3$ and supercooled to temperature $T_3$ (point 3 in FIG. 5) by performing useful work in causing rotation of the rotor 89 of the compressor-expander unit 48 simultaneous rotation of the shafts 49 and 50. The expanded and supercooled first gas is exhausted from the gas operating chamber of the expander 14 into the operating chamber of the gas/liquid compressor 13. The separated liquid is heated by absorbing polytropic heat and is also discharged from the vortex separator 15 to the pump 16 and injected into the gas/liquid compressor. The expanded and supercooled first gas is mixed and heat exchanged with the liquid which has adsorbed polytropic heat to renew or supplement the gas/liquid mixture. The finely dispersed cool gas/liquid mixture is compressed in a polytropic process completing the bottoming cycle (point 1 in FIG. 5).

The described process satisfies basic statements of the Second Law of Thermodynamics: no heat engine operating in cycles can convert into work all the heat supplied to the working fluid; it must reject some heat. The described low-temperature bottoming cycle operates on the three-step cycle and receives heat $Q_1$ from external heat reservoir while doing work $N_1$ has heat-rejection process absorbing heat $Q_2$ by means of internal heat exchanging process as part of the cycle as represented in FIG. 5. All the heat $Q_1$ supplied to the first gas does not convert into work. Appropriateness of this statement is confirmed by the energy balance:

$$Q_1 = Q_2 + N_1 \tag{1}$$

Or $C_{P_1}(T_2 - T_1) =$ (2)

$$-C_V \frac{n-k_1}{n-1}(T_1 - T_3) + C_{P_1}(T_2 - T_3) - \frac{n}{n-1} R_1(T_1 - T_3)$$

Substitution from the part of equations $k_1 = C_{P1}/C_V$;

$$T_3 = \left(T_2\left(\frac{1}{\pi_1}\right)\right)^{\frac{k_1-1}{k_1}}$$

$$T_1 = T_2\left(\pi^{\frac{n-1}{n}}\left(\frac{1}{\pi_1}\right)\right)^{\frac{k_1-1}{k_1}};$$

$R_1/C_V = k-1$, and transformation of the equation (2) reduce it to an identity 1=1.

Where $C_{P_1}$=kJ/kg–K heat capacity of first gas at constant pressure $C_V$=kJ/m–K heat capacity of first gas at constant volume $k_1 = C_{P1}/C_V$ adiabatic exponent of first gas n=polytropic exponent $\pi_1 = P_2/P_3 = P_1/P_3$ expansion and compression ratio of the first gas $R_1 = kJ/kg\text{-}K$ specific gas constant of first gas The theoretical thermal efficiency ($\eta_T$) of the bottoming three-step cycle can be expressed as:

$$\eta_T = \frac{N_1}{Q_1} = \frac{1 - \left(\frac{1}{\pi_1}\right)^{\frac{k_1-1}{k_1}} \left[1 + \frac{n}{n-1} \cdot \frac{k_1-1}{k_1}\left(\pi_1^{\frac{n-1}{n}} - 1\right)\right]}{1 - \left(\frac{1}{\pi_1}\right)^{\frac{k_1-1}{k_1}} \cdot \pi_1^{\frac{n-1}{n}}} \quad (3)$$

Figure 6:
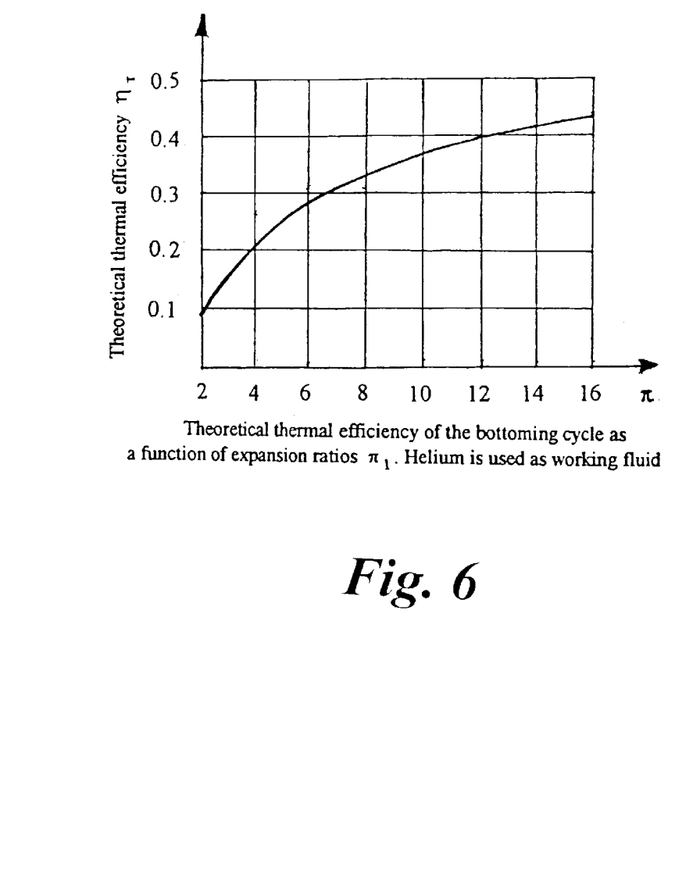
FIG. 6 is a graph illustrating theoretical thermal efficiency of the bottoming cycle.

FIG. 6 shows a relationship of the quantity in $\eta_T$ and the pressure ratio $\pi_1$ of the gas using helium as a working fluid. That closed three-step cycle is possible, given a heat-rejection process is conducted. For this, the temperature $T_3$ of the expanded and supercooled first gas provides a temperature difference ($T_1-T_3$) which is sufficient to absorb polytropic heat $Q_2$ by mixing with liquid and forming a gas/liquid mixture with the temperature $T_1$ as a result of the heat exchanging and the polytropic compression.

Completion of a heat-rejection process also depends on the polytropic exponent n. The polytropic exponent n and mass flow rate of the liquid $m_2$ by flow rate of the first gas $m_1=1$ can be derived from the heating balance that occurs by interchanging of the polytropic heat $Q_2$ to the liquid and from the liquid to the supercooled first gas:

$$-C_V \frac{n-k_1}{n-1}(T_1 - T_3) = C_L m_2 (T_1 - T_3) = C_{P_1}(T_1 - T_3) \quad (4)$$

Whence $$n = \frac{2k_1}{1+k_1} \quad (5)$$

and $$m_2 = C_{P_1}/C_L \quad (6)$$

Where $C_L = kJ/kg\text{-}K$ = heat capacity of the liquid.

The polytropic exponent n can also be derived from the heating balance that occurs by rejection of the heat $Q_2$ as waste heat:

$$C_{P_1}(T_1 - T_3) = C_{P_1}(T_2 - T_1) - \left[C_{P_1}(T_2 - T_3) - \frac{n}{n-1}R_1(T_1 - T_3)\right]$$

Substitution from the part of the equations $$T_1 = T_2 \pi^{\frac{n-1}{n}}; \quad R_1 = C_{P_1}\frac{k_1-1}{k_1} \quad \text{and} \quad T_3 = T_2\left(\frac{1}{\pi_1}\right)^{\frac{k_1-1}{k_1}}$$

Will give $$n = \frac{2k_1}{1+k_1}$$

Thus, the same consequence is derived from either interchanging of the polytropic heat $Q_2$ to the liquid and from the liquid to the supercooled first gas, or from the heating balance that occurs by rejection of the heat $Q_2$ as waste heat.

That is to say, the polytropic specific heat $Q_2$ is also waste heat for this three-step cycle and the equation (4) is correct.

Figure 7:
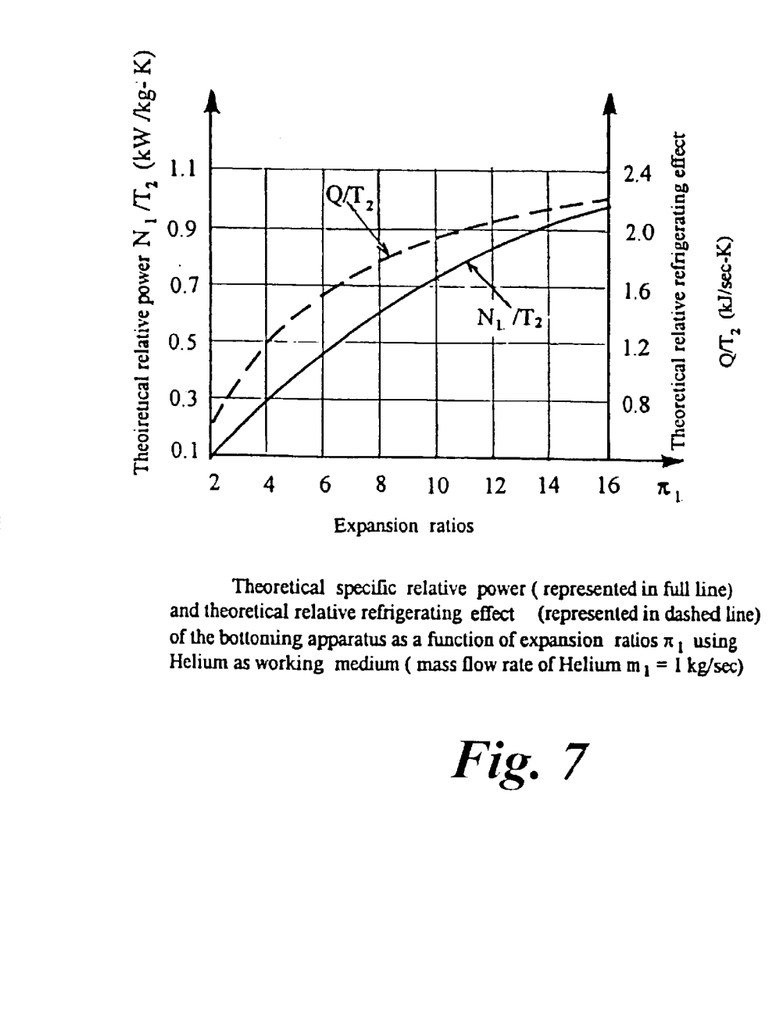
FIG. 7 is a graph illustrating the theoretical specific relative power and refrigerating effect of the bottoming cycle apparatus.

The dependence of the theoretical specific power N (kW/kg) of the bottoming cycle (mass flow rate of the first gas m=1 kg/sec) is calculated according to the following equation:

$$N_1 = R_1 \left\{ \frac{k_1-1}{k_1} T_2 \left[1 - \left(\frac{1}{\pi_1}\right)^{\frac{k_1-1}{k_1}}\right] - \frac{n}{n-1} T_3 \left[\pi_1^{\frac{n-1}{n}} - 1\right] \right\} \quad (7)$$

$$\frac{N_1}{T_2} = R_1 \left\{ \frac{k_1-1}{k_1}\left[1 - \left(\frac{1}{\pi_1}\right)^{\frac{k_1-1}{k_1}}\right] - \frac{n}{n-1}\left[\pi_1^{\frac{n-1}{n}} - 1\right] \right\} \quad (8)$$

Where $R_1 = kJ/kg\text{-}K$ = specific gas constant of first gas $\pi_1 = P_2/P_3 = P_1/P_3$ = expansion and compression ratios of the first gas FIG. 7 is graph showing the quantity $N_1/T_2$ (kW/kg-K) (represented in full line) on the pressure ratio $\pi_1$ of the first gas using helium as the work medium.

The theoretical relative specific refrigerating effect $Q/T_2$ (kJ/sec-K) of the bottoming low-temperature cycle (mass low rate of the first gas $m_1=1$ kg/sec) can be calculated to the following equation:

$$\frac{Q}{T_2} = \frac{C_{P_1}(T_2 - T_1)}{T_2} = C_{P_1}\left[1 - \left(\frac{1}{\pi_1}\right)^{\frac{k_1-1}{k_1}} \pi_1^{\frac{n-1}{n}}\right] \quad (9)$$

FIG. 7 shows, in dashed line, the dependence of the quantity $Q/T_2$ (kJ/sec-K) on the pressure ratio $\pi_1$ of the bottoming cycle of the system using helium as working medium.

Figure 8:
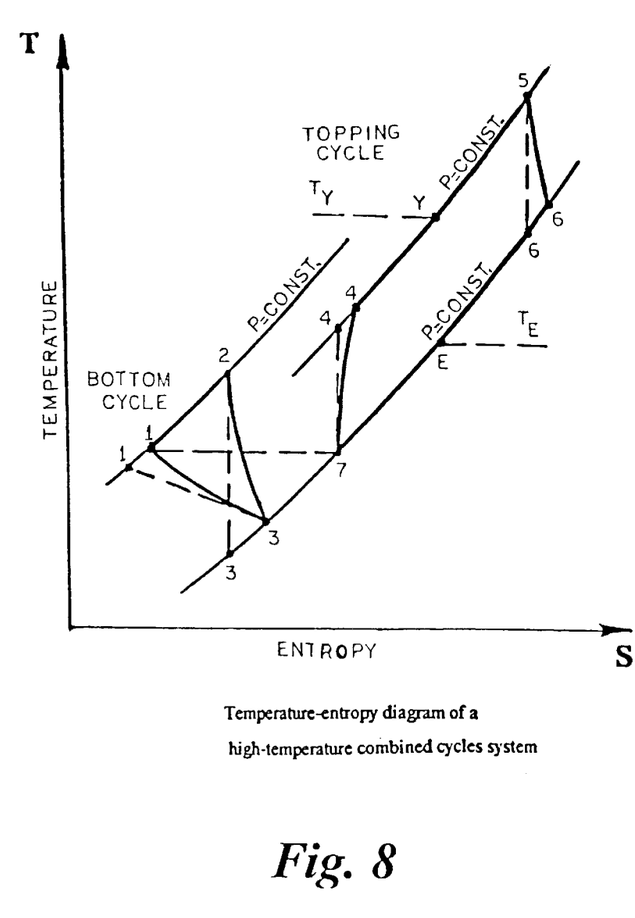
FIG. 8 is a temperature-entropy graph of the combined bottoming and topping cycles.

Referring now to FIGS. 1 and 8, the working process of the first embodiment 10 utilizing the bottoming cycle 11 and the open modified Brayton topping cycle portion 12 will be described.

As the rotor of the air compressor 51 of the topping cycle rotates, ambient air with the temperature $T_E$ is drawn through the heat exchanger 17 of the bottoming cycle where it is cooled to temperature $T_7$ (point 7 in FIG. 8) is then compressed to pressure $P_{4'}$ and temperature $T_{4'}$ (point 4' in FIG. 8). The compressed air is discharged into the heat exchanger/recuperator 54 where it is isobarically preheated to temperature $T_y$ (point Y in FIG. 8) using waste heat and passed to the combustor 53 where it is isobarically heated to temperature $T_5$ (point 5 in FIG. 8). The heated and compressed air from the combustion chamber enters the gas turbine 52 where it is adiabatically expanded to pressure $P_{6'}$ and temperature $T_{6'}$ (point 6 in FIG. 8) performing useful work and causing simultaneous rotation of the rotors of the gas turbine, air compressor and. power take off means. Spent working fluid from the gas turbine 52 is supplied to the heat exchanger/recuperator 54 giving up its waste heat to the compressed air and is discharged through an exhaust port 61.

The actual specific total power of the binary power system (mass flow rate of the air $m_3=1$ kg/sec) may be expressed as:

$$(\Sigma N)_A = \quad (10)$$

$$MR_1 \left\{ \eta_c \frac{k_1-1}{k_1} T_2 \left[1 - \left(\frac{1}{\pi_1}\right)^{\frac{k_1-1}{k_1}}\right] - \frac{1}{\eta_c}\frac{n}{n-1} T_{3'}\left[\pi_1^{\frac{n-1}{n}} - 1\right] \right\} +$$

-continued $$C'_{P_2}\eta_c T_5\left(1 - \frac{1}{\pi_2^{\frac{k'_2-1}{k'_2}}}\right) - C''_{P_2}\frac{1}{\eta_c}T_7\left(\pi_2^{\frac{k''_2-1}{k''_2}} - 1\right) \quad (5)$$

Where
- $C'_{P_2}$ and $C''_{P_2}$ = heat capacity of air at high and low-temperature accordingly at constant pressure
- $k'_2$ and $k''_2$ = adiabatic exponent of air at high and low-temperature accordingly
- $\eta_e$ = expander efficiency
- $\eta_c$ = compressor efficiency
- $\pi_2 = P_5/P_6 = P_4/P_7$ = expansion and compression ratios of the second gas The amount $M = m_1/m_3$ can be calculated from the heating balance:

$$C'_{P_2}M(T_2 - T_P) = C''_{P_2}(T_E - T_7) \quad (11)$$

whence $$M = \frac{T_E - T_7}{T_2 - T_{1'}} \cdot \frac{C''_{P_2}}{C_{P_1}} \quad (12)$$

The actual thermal efficiency $(\eta_T)_A$ of the system can be calculated:

$$(\eta_T)_A = \frac{(\Sigma N)_A}{(T_5 - T_Y) \cdot C'_{P_2}} \quad (13)$$

Figure 9:
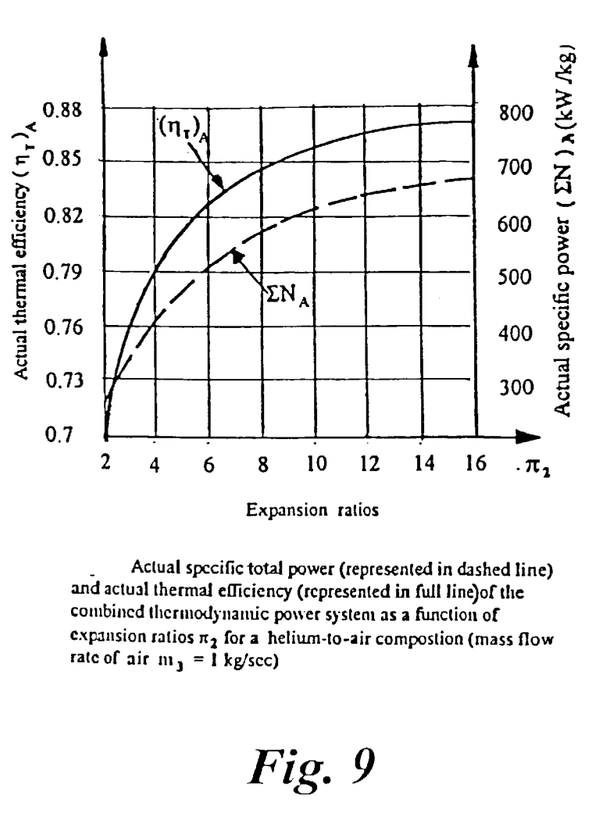
FIG. 9 is a graph illustrating specific total power and actual thermal efficiency of the combined power system.

Where
- $T_Y = \eta_r(T_{6'} - T_{4'}) + T_{4'}$
- $\eta_r$ = efficiency of the regenerator FIG. 9 is graph showing the dependence of the quantity $(\Sigma N)_A$ (kW/kg) represented by dashed line, and the quantity $(\eta_r)_A$, represented in full line on the pressure ratio $\pi_2$ for a helium—to—air gas composition wherein $\pi_1 = 14$; $T_5 = 1$, 600° K; $\eta_e = 0.9$; $\eta_c = 0.85$; $\eta_r = 0.9$; $T_E = 291°$ K; $T_7 = 80°$ K; and $M = 1.1$.

The working process of the second embodiment 10A utilizing the bottoming cycle 11 and the closed modified Brayton topping cycle portion 12A is like the working process of the first embodiment and is also is represented on the temperature-entropy diagram of FIG. 8.

While this invention has been described fully and completely with special emphasis upon preferred embodiments, it should be understood that, within the scope of the appended claims, the invention may be practiced otherwise than specifically described herein.

What is claimed is:

1. A method for transforming thermal energy into mechanical energy utilizing thermodynamic bottoming and topping cycles and binary working fluids, comprising:
   providing a rotary gas/liquid compressor and rotary gas expander unit having a common oval-shaped operating chamber and a common rotor therein dividing said operating chamber into a gas/liquid compressor chamber and a gas expander chamber;
   introducing a first gas/liquid working fluid mixture of a non-condensable first gas and a low-temperature liquid into said gas/liquid compressor chamber and polytropically compressing it therein in a low-temperature closed bottoming cycle;
   introducing a second working fluid gas into said gas expander chamber and compressing and expanding said second working fluid gas in a topping cycle to produce power;
   separating said polytropically compressed first gas/liquid working fluid mixture into a non-condensable first gas component having a low boiling temperature and a liquid component;
   isobarically heating and adiabatically expanding said separated non-condensable first gas component in a heat exchanger having a second gas as a heat source to cool said second gas to produce cool refrigerated air to be used for said second working fluid gas of said topping cycle and to facilitate rejection of waste heat of said topping cycle;
   discharging said isobarically heated first gas component of said first gas/liquid working fluid from said heat exchanger into said gas expander chamber;
   adiabatically expanding said first gas component in said gas expander chamber to simultaneously rotate said common rotor and produce useful work and thereby extract heat from said adiabatically expanded first gas component to cool it to a temperature below the boiling point of said liquid component and facilitate rejection of waste heat from said bottoming cycle; and
   discharging a portion of said adiabatically expanded cooled first gas component from said gas expander chamber into said gas/liquid compressor chamber; and introducing and atomizing a portion of said separated liquid component into said gas/liquid compressor chamber and mixing it with said cool first gas component during polytropic compression of said gas/liquid mixture to serve as a coolant for said liquid component to adsorb waste heat and supplement said first gas/liquid mixture and to facilitate polytropic compression of said gas/liquid mixture therein.

2. The method according to claim 1, wherein said steps of compressing and expanding said second working fluid of said topping cycle comprises the steps of:
   drawing said cooled ambient air from said bottoming cycle heat exchanger and introducing it into a topping cycle rotary air compressor having a rotor and compressing it therein;
   isobarically preheating said compressed air in a topping cycle heat exchanger/recuperator using waste heat of said topping cycle;
   isobarically heating said compressed and preheated air in a topping cycle combustion chamber;
   discharging said isobarically heated and compressed air from said topping cycle combustion chamber into a topping cycle rotary gas turbine having a rotor connected with said topping cycle rotary air compressor rotor;
   adiabatically expanding said isobarically heated and compressed air in said topping cycle rotary gas turbine to simultaneously rotate said topping cycle gas turbine rotor and said topping cycle air compressor rotor to produce useful work;
   discharging a first portion of spent expanded air from said topping cycle expander into said topping cycle heat exchanger/recuperator to be used as said waste heat to produce said preheated air; and
   discharging a second portion of said spent expanded air from said topping cycle heat exchanger/recuperator as exhaust.

3. The method according to claim 1, wherein
said steps of compressing and expanding said second working fluid gas in said topping cycle comprise the steps of:
- drawing said cooled second working fluid gas from said heat exchanger of said bottoming cycle and introducing it into a topping cycle rotary gas compressor having a rotor and compressing it therein;
- isobarically preheating said compressed second working fluid gas in a topping cycle heat exchanger/recuperator using waste heat of said topping cycle;
- isobarically heating said compressed and preheated second working fluid gas in a topping cycle heat exchanger/combustor;
- discharging said isobarically heated and compressed second working fluid gas from said topping cycle heat exchanger/combustor into a topping cycle rotary gas turbine having a rotor connected with said closed topping cycle rotary air compressor;
- adiabatically expanding said isobarically heated and compressed second working fluid gas in said topping cycle rotary gas turbine to simultaneously rotate said topping cycle gas turbine rotor and said topping cycle gas compressor rotor to produce useful work;
- discharging a portion of spent expanded second working fluid gas from said topping cycle gas turbine into said topping cycle heat exchanger/recuperator to be used as said waste heat to produce said preheated second working fluid gas; and
- discharging a portion of said spent expanded second working fluid gas from said topping cycle heat exchanger/recuperator into said bottoming cycle heat exchanger to cool said spent expander second working fluid gas thereby absorbing the remainder of waste heat.

4. A combined thermodynamic power system comprising:
- a rotary gas/liquid compressor and rotary gas expander unit having a common oval-shaped operating chamber and a common rotor therein dividing said operating chamber into a gas/liquid compressor chamber and a gas expander chamber, said gas/liquid compressor chamber having a first working fluid inlet, a first working fluid discharge outlet, and a liquid atomizer injector, and said gas expander chamber having a first working fluid inlet and first working fluid outlet, said gas expander chamber first working fluid outlet being aligned with said gas/liquid compressor chamber first working fluid inlet;
- vortex separator means for separating a gas/liquid mixture into a gas component and a liquid component, said separator having an inlet connected with said gas/liquid compressor chamber discharge outlet, a gas outlet, and a liquid outlet;
- bottoming cycle heat exchanger means having an inlet connected with said vortex separator gas outlet, an outlet connected with said bottoming cycle gas expander chamber first working fluid inlet, said heat exchanger means disposed in heat exchange relation with a second working fluid of a topping cycle;
- rotary pump means having an inlet connected with said vortex separator liquid outlet, and an outlet connected with said gas/liquid compressor chamber liquid atomizer injector;
- a gas storage container containing a non-condensable gas under pressure and having a gas inlet connected through one-way valve means with said vortex separator means leas outlet and with said bottoming cycle gas expander chamber first working fluid inlet;
- a liquid storage container containing a liquid under pressure and having all inlet connected through one-way valve means with said vortex separator means liquid outlet and all outlet connected with said rotary pump inlet;
- throttle means disposed between said vortex separator gas outlet and said heat exchanger means inlet and between said vortex separator gas outlet, said bottoming cycle gas expander chamber first working fluid inlet, between said bottoming cycle heat exchanger outlet and said bottoming cycle gas expander chamber first working fluid inlet, between said gas storage tank and said bottoming cycle gas expander chamber first working fluid inlet, between said liquid storage tank outlet and said rotary pump inlet, and between said vortex separator liquid outlet and said rotary pump inlet; and
- bottoming cycle control means including temperature and pressure sensors connected with said throttle means for controlling the operation of selected ones thereof responsive to the temperature and pressure of a first working fluid entering said rotary gas expander chamber first working fluid inlet; wherein
- upon rotation of said rotary gas/liquid compressor rotor, a first gas/liquid working fluid mixture of said non-condensable gas and said liquid is drawn into said gas/liquid compressor chamber and compressed in a polytropic process therein and the polytropically compressed gas/liquid mixture is discharged into said vortex separator and separated into a non-condensable gas component having a low boiling temperature and a non-freezable, lubricating liquid component;
- said separated non-condensable (gas component is conducted through said bottoming cycle heat exchanger in heat exchange relation with said second working fluid of said topping cycle to isobarically heat said non-condensable first gas thereby cooling said topping cycle second working fluid;
- said isobarically heated non-condensable gas component is discharged from said bottoming cycle heat exchanger into said bottoming cycle gas expander operating chamber and adiabatically expanded therein to simultaneously rotate said bottoming cycle gas/liquid compressor and gas expander common rotor, produce useful work and extract heat from said adiabatically expanded gas component to cool it to a temperature below the boiling point of said liquid component and facilitate rejection of waste heat from said bottoming cycle;
- a portion of said cooled expanded gas component is discharged from said bottoming cycle rotary gas expander chamber into said gas/liquid compressor chamber;
- a portion of said separated liquid component from said vortex separator is introduced and atomized into said gas/liquid compressor chamber and mixed with said expanded cool gas component entering said gas/liquid compressor chamber to serve as a coolant for said liquid component to adsorb polytropic heat and to supplement said gas/liquid mixture thereby providing its polytropic compression; and
- said temperature and pressure sensor and control means controlling the operation of selected ones of said throttle means responsive to the temperature and pressure of fluids passing through said system to control the flow of fluids through said bottoming cycle.

5. The system according to claim 4 further comprising:

an open topping cycle including a topping cycle rotary air compressor having a rotor, an air inlet, and a discharge outlet;

a heat exchanger/recuperator having an air inlet connected with said topping cycle air compressor discharge outlet, a second working fluid inlet, a preheated air outlet and a discharge outlet;

a combustion chamber having a preheated air inlet connected with said heat exchanger/recuperator preheated air outlet, and a high-temperature second working fluid discharge port;

a topping cycle rotary gas turbine having a rotor connected with said topping cycle air compressor rotor and with said bottoming cycle gas/liquid compressor and gas expander common rotor for simultaneous rotation therewith, a second working fluid inlet connected with said combustion chamber discharge port, and a second working fluid outlet; and power take-off means connected with at least one of said topping cycle gas expander or air compressor rotor; wherein upon rotation of said topping cycle air compressor a portion of cool ambient air is drawn therein from said bottoming cycle heat exchanger means and compressed therein and discharged into said heat exchanger/recuperator and preheated therein;

said preheated compressed air discharged from said heat exchanger/recuperator into said combustion chamber and heated therein;

said heated compressed air and other products of combustion are discharged from said combustion chamber into said topping cycle gas turbine and adiabatically expanded therein to simultaneously rotate said topping cycle gas expander rotor, said air compresor rotor, said bottoming cycle gas expander and gas/liquid compressor common rotor, and said power take-off means to produce useful work; and spent working fluid is discharged from said topping cycle heat exchanger/recuperator through said exhaust port.

6. The system according to claim 4 further comprising:

a closed topping cycle including a topping cycle rotary gas compressor having a rotor, a gas inlet and a discharge outlet;

a heat exchanger/recuperator having a gas inlet connected with said topping cycle gas compressor discharge outlet, a second working fluid inlet, a preheated gas outlet, and discharge outlet;

a heat exchanger/combustor having a preheated gas inlet connected with said heat exchanger/recuperator preheated gas outlet, and a high-temperature second working fluid discharge port;

a topping cycle rotary gas turbine having a rotor connected with said topping cycle gas compressor rotor and with said bottoming cycle gas/liquid compressor and gas expander common rotor for simultaneous rotation therewith, a second working fluid inlet connected with said heat exchanger/combustor discharge port, and a second working fluid outlet;

a topping cycle gas storage container containing a second working fluid gas under pressure and having gas inlet connected through one-way valve means with said topping cycle rotary gas compressor discharge outlet, and gas inlet connected with said topping cycle rotary gas compressor discharge outlet;

throttle means disposed between said topping cycle gas storage container outlet and said topping cycle rotary gas compressor discharge outlet;

topping cycle control means including temperature and pressure sensors connected with said throttle means for controlling the operation of selected ones thereof responsive to the temperature and pressure of said second working fluid gas entering said topping cycle rotary gas turbine; and power take-off means connected with at least one of said topping cycle as compressor or gas compressor rotors; wherein upon rotation of said topping cycle gas compressor a portion of gas is drawn thereinto from said bottoming cycle heat exchanger means and compressed therein and discharged into said heat exchanger/recuperator and preheated therein;

said preheated/compressed gas discharged from said heat exchanger/recuperator into said heat exchanger/combustor and heated therein;

said heated and compressed gas is discharged from said heat exchanger/combustor into said topping cycle gas turbine and adiabatically expanded therein to simultaneously rotate said topping cycle gas turbine rotor, said topping cycle gas compressor rotor, said bottoming cycle gas/liquid compressor and gas expander common rotor and said power take-off means to produce useful work;

said portion of spent expanded second working fluid gas is discharged from said topping cycle gas turbine into said topping cycle heat exchanger/recuperator to be used as said waste heat to produce said preheated second working fluid gas; and said portion of spent expanded second working fluid gas is discharged from said topping cycle heat exchanger/recuperator into said bottoming cycle heat exchanger to cool said spent expanded second working fluid gas thereby absorbing the remainder of waste heat.

7. A combined thermodynamic power system according to claim 4 further comprising:

a thermally insulated housing substantially enclosing said rotary gas/liquid compressor and rotary gas expander unit, said vortex separator means, said rotary pump, said heat exchanger, said gas storage container, and said liquid storage containers.

8. A combined thermodynamic power system according to claim 4 wherein said rotary gas/liquid compressor and rotary gas expander unit has a common oval-shaped operating chamber with a peripheral side wall which is oval-shaped in cross section, and parallel opposed facing flat end walls;

a common cylindrical rotor having a circular side wall, parallel opposed flat end walls, a concentric shaft extending outwardly from each said end wall, and at least four slots disposed at said side wall perpendicular to said end walls, said common rotor rotatably mounted by said shafts eccentrically in said common oval-shaped operating chamber relative to the major axis of said operating chamber;

at last two elongate rectangular rotor blades one slidably mounted in each of said slots extending through said rotor in mutually perpendicular relation and each independently movable relative to the other in a radial direction, each said rotor blade move with said rotor in contact with said oval-shaped peripheral side wall;

said common rotor and said rotor blades dividing said common operating chamber into a gas/liquid compressor chamber and a gas expander chamber, wherein upon rotation, said gas expander operating chamber will act as a gas expander and said gas/liquid compressor chamber will act as gas/liquid compressor;

said gas expander working fluid inlet and said working fluid outlet are disposed in said gas expander chamber, and said gas/liquid compressor working fluid inlet and said discharge working fluid outlet are disposed in said gas/liquid compressor chamber; and said gas expander working fluid outlet and said gas/liquid compressor working fluid inlet are aligned.

9. A combined thermodynamic power system according to claim 4 wherein an inner periphery of said oval-shaped common chamber of said gas/liquid compressor operating chamber and gas expander operating chamber in the plane of rotor rotation is configured according to the equation $$\frac{x^2}{h^2} + \frac{y^2 \, y^2}{(h+1/4L)^2 - L^2} = 1$$

where x and y represent vertical and horizontal coordinates of said oval-shaped common chamber, h is equal to one-half of the major axis of said oval-shaped inner periphery, and L is equal to the eccentrically offset distance between the center of said oval-shaped common chamber, and the center of said gas/liquid compressor and gas expander common rotor.

10. A combined thermodynamic power system according to claim 4 further comprising:

roller means on each said rotor disposed adjacent said slots and engaged with said rotor blades to support and facilitate extension and retraction thereof.

11. A combined thermodynamic power system according to claim 4 further comprising:

seal means disposed between the outer surfaces of each said rotor end walls periphery and the inner surface of each said oval-shaped common chamber end walls to form a sealing relation there between; and seal means disposed in said circular side wall slots through which said blades three flat surfaces of each said blade.

12. A combined thermodynamic power system according to claim 4 wherein said low-temperature liquid is selected from the group consisting of nitrogen, non-freezable lubricating oil, water, antifreeze, and mixtures thereof.

* * * * *